(12) United States Patent
Latos et al.

(10) Patent No.: US 6,181,112 B1
(45) Date of Patent: Jan. 30, 2001

(54) APPARATUS AND METHOD FOR LIMITING GENERATOR PEAK VOLTAGE

(75) Inventors: Thomas S. Latos, Huntley; Hassan Mansir, Rockford, both of IL (US)

(73) Assignee: Hamilton Sundstrand Corporation, Rockford, IL (US)

(*) Notice: Under 35 U.S.C. 154(b), the term of this patent shall be extended for 0 days.

(21) Appl. No.: 09/209,143

(22) Filed: Dec. 10, 1998

(51) Int. Cl.$^7$ .................................................. H02P 9/00
(52) U.S. Cl. ................................................ 322/59; 322/29
(58) Field of Search ................................ 322/59, 60, 27, 322/29, 46

(56) References Cited

U.S. PATENT DOCUMENTS

| | | | |
|---|---|---|---|
| 2,889,475 | 6/1959 | Emerson | 310/171 |
| 3,549,981 | 12/1970 | Dolbec | 322/25 |
| 4,004,211 | 1/1977 | Takao et al. | 322/63 |
| 4,121,148 | * 10/1978 | Platzer | 322/59 |
| 4,143,280 | * 3/1979 | Kuehn, Jr. et al. | 290/9 |
| 4,176,292 | 11/1979 | Kalsi et al. | 310/52 |
| 4,246,532 | * 1/1981 | Kubo | 322/89 |
| 4,467,267 | 8/1984 | Hucker et al. | 322/61 |
| 4,871,960 | 10/1989 | Yoden | 322/24 |
| 4,885,526 | 12/1989 | Szabo | 322/66 |
| 5,239,254 | * 8/1993 | Inoue et al. | 322/86 |
| 5,444,214 | * 8/1995 | Crouse et al. | 219/133 |
| 5,486,751 | * 1/1996 | Koenig | 322/86 |
| 6,020,725 | * 2/2000 | Roberts | 322/90 |

FOREIGN PATENT DOCUMENTS

| | | | |
|---|---|---|---|
| 25 41 251 A1 | 3/1977 | (DE) | H02J/7/16 |
| 0 237 246 A2 | 9/1987 | (EP) | F02N/11/04 |

OTHER PUBLICATIONS

PCT International Search Report for Application No. PCT/US99/29031 transmitted Mar. 15, 2000.

* cited by examiner

*Primary Examiner*—Nicholas Ponomarenko
(74) *Attorney, Agent, or Firm*—Marshall, O'Toole, Gerstein, Murray & Borun

(57) ABSTRACT

An apparatus for limiting a peak voltage of a generator provides an auxiliary winding within the stationary exciter filed magnetic structure. The auxiliary winding is coupled to a controllable current source that provides a current to the auxiliary winding based upon an operating speed of the generator. The current flow is effective for moving the quiescent flux bias point of the exciter field magnetic structure for limiting the peak voltage for any operating speed of the generator.

22 Claims, 1 Drawing Sheet

APPARATUS AND METHOD FOR LIMITING GENERATOR PEAK VOLTAGE

FIELD OF THE INVENTION

The present invention relates generally to electrical generators, and more particularly, the present invention relates to an apparatus and method for limiting the peak voltage output of an electrical generator.

BACKGROUND OF THE INVENTION

Within various electrical generation devices, and particularly within variable frequency (VF) electrical generators and generator control unit (GCU) systems, high voltage can occur when the stationary exciter field current is commanded to a maximum level. Such a situation may occur when, for example, the point-of-regulation (POR) sensing fails, and the GCU commands full field current. The maximum voltage amplitude appearing at the terminals of a synchronous generator during full field excitation is a function of the saturation characteristics of the generator, the magnitude of the stationary field current, and the speed of rotation or electrical generation frequency.

Modern generators operating in, for example, the 400 Hertz (Hz) frequency range are designed to limit the maximum voltage which appears at the terminals of the generator by carefully selecting the operating point on the B-H curve of iron used in the generator. With such careful selection of the B-H operating point, if a full field current event occurs, the machine saturates to produce a maximum output voltage of approximately 150–160 V line-to-neutral (1–n). This maximum value is well below the typical maximum specification value of 180 V 1–n. This type of peak voltage limiting, however, is a function of the physical characteristics, construction and materials, of the generator itself and the speed or frequency at which it is operated. This type of voltage limit may be simply explained as the generator has a maximum available magnetic flux. The voltage output is proportional to this flux and to operating speed.

Many generators are required to operate over widely varying rotational input speeds, for example, as high as 2:1 maximum-to-minimum operating speed. In such cases, since the maximum voltage would change with rotation speed or frequency of the generator, at two times speed the maximum voltage may be 300–320 V 1–n or more. This requires the load equipment be designed to tolerate these higher voltages, which is likely to add to the cost of the equipment and potentially effect the reliability of the equipment.

More traditional approaches have been to provide a "voltage clamp" at the output of the generator that is activated when the voltage exceeds a value, say 170 V 1–n. Alternatively, a very fast responding exciter current controller may be used. Both of these approaches suffer from fault tolerance. Neither system is required to perform until a voltage is too high. An undetected passive failure disabling the exciter current peak voltage controller or the voltage clamp may result in a high voltage condition at the terminals of the generator. This is a very undesirable condition.

It has been known in the art to use compensating coils in generators to perform functions other than peak voltage regulation. For example, U.S. Pat. No. 4,871,960 describes an exciter having two excitation coils each with an associated voltage regulator. The primary coil and associated circuit regulates the generator voltage with a current inversely proportional to speed. The other coil and associated circuit compensates for load and speed fluctuations.

In U.S. Pat. No. 4,885,526 a scheme is described to compensate for the effect of armature reactance on the flux distribution within the machine. This concept supposedly improves the efficiency of the machine if the compensating circuit uses mostly reactive power.

In U.S. Pat. No. 4,176,292 an auxiliary field winding is utilized to provide trim flux along with steady-state flux generated by the main field to accommodate load changes in a superconductive generator.

Thus, a need remains for an improved apparatus and method for peak voltage limiting in generator applications that is both cost-effective and reliable.

SUMMARY OF THE INVENTION

An apparatus in accordance with the present invention provides generator peak voltage protection and includes a peak voltage limiting current associated with the exciter field magnetic structure. The peak voltage limiting circuit is energized when the generator is supplied with exciter field current and is responsive to an operating characteristic of the generator for limiting peak voltage output of the generator. A control signal, responsive to the operating characteristic, is supplied from a control signal source to a variable current source that is coupled to the auxiliary winding.

Operation of the peak voltage limiting circuit may be coordinated with the generator control unit (GCU), which would then provide the control signal to the variable current source.

Operation of the peak voltage limiting circuit is disabled when the generator is not supplied with exciter field current.

An operating characteristic of the generator may be the rotational speed of the generator or the frequency of generation.

In another aspect of the present invention, the current flow in the auxiliary winding is effective to offset the magnetic state of the exciter field to effectively limit the ceiling voltage of the generator.

In still another aspect of the present invention, monitoring of the current supplied to the auxiliary winding may provide an indication of the proper operation of the peak voltage limiting circuit.

A method in accordance with the present invention provides generator peak voltage protection by offsetting the magnetic state of the exciter field responsive to an operating characteristic of the generator in order to limit the ceiling voltage of the generator.

Another method in accordance with the present invention includes providing an auxiliary winding in association with the exciter field magnetic structure and selectively applying current to the auxiliary winding responsive to an operating characteristic of the generator.

BRIEF DESCRIPTION OF THE DRAWINGS

The many advantages and features of the present invention will be apparent to one having ordinary skill in the art from the following description of the preferred embodiments taken in conjunction with the accompanying drawings in which.

DETAILED DESCRIPTION OF THE PREFERRED EMBODIMENTS

Figure 1:
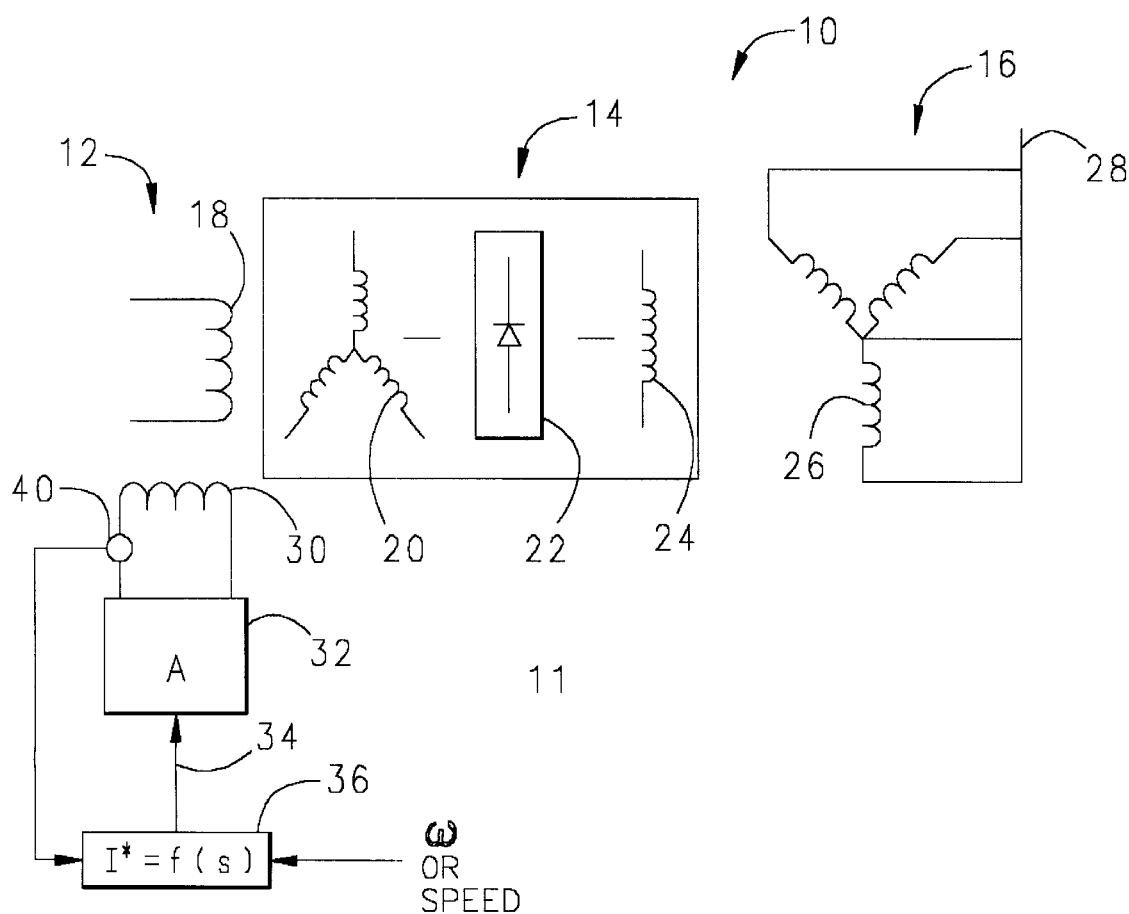
FIG. 1 is a schematic representation of a generator incorporating a peak voltage limiting circuit in accordance with a preferred embodiment of the present invention.

With reference to FIG. 1, a generator 10 includes an exciter field magnetic structure 12, a rotor assembly 14 and an armature assembly 16. Exciter field magnetic structure 12 includes an exciter field coil 18 which is coupled to a controlled exciter field current source as is very well known in the art. Rotor 14 includes rotor coils 20 coupled through rectifier assembly 22 to field coil 24, also as is known in the art. Rotor 14 is further coupled to a prime mover (not shown), which in accordance with preferred embodiments of the present invention may provide rotational mechanical energy to rotor 14 with a range of rotational speed up to and potentially in excess of 2:1 maximum-to-minimum speed. Armature 16 includes armature coils 26 in which, during operation of generator 10, output current is induced and coupled to terminals 28.

Generator 10 further includes a peak voltage limiting circuit 11. Peak voltage limiting circuit 11 includes coupled in association with the exciter field magnetic structure 12, an auxiliary winding 30. Auxiliary winding 30 is coupled to a variable current source 32 which is responsive to a control signal on line 34 from control signal source 36. Control signal source 36 is coupled to receive as an input at least one operating characteristic of generator 10. In a preferred embodiment of the present invention, control signal source 36 is coupled to an output of a rotor rotational speed sensor or receives generator speed or frequency information from a generator control unit (GCU) (not depicted). Control signal source 36 may be implemented as standalone circuit element, as a microprocessor operating under a control program or as part of the GCU. Variable current source 32 may be any suitable current source capable of providing a variable current output responsive to a control signal.

Figure 2:
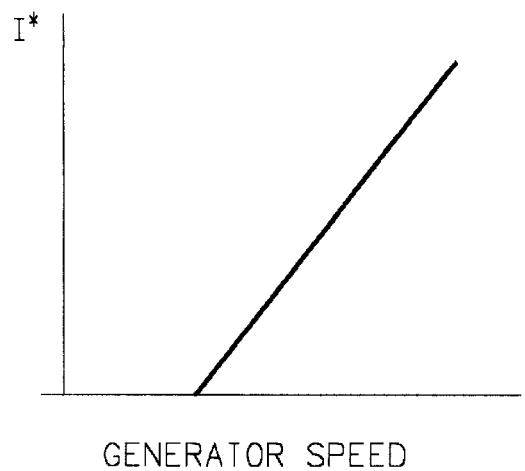
FIG. 2 is graph illustrating auxiliary winding current as a function of generator speed.

Responsive to the rotational speed of rotor 14, control signal source 36 provides a control signal to variable current source 32, which preferably provides an auxiliary winding current (I*) in accordance with the curve illustrated in FIG. 2. Observed in FIG. 2 is that at low generator speed, i.e., low rotor speed, no current is provided to winding 30. As generator speed increases, current I* flows in winding 30, which in accordance with a preferred embodiment, increases linearly with generator speed to a maximum value. Of course it will be appreciated that the generator speed where current I* is initiated as well as its characteristic curve with generator speed may be modified for virtually any generator application and does not have to be linear. The curve may be further modified based upon various other operating characteristics of generator 10 such as frequency of generation. It will be further appreciated that when the generator is not supplied exciter field current, current may not be supplied to winding 30.

The effect of current I* flowing in winding 30 is to move the quiescent flux bias point of the exciter field magnetic structure as a function of generator speed. The result is that the maximum current that may be induced in rotor field coil 24 is capped, which in turn caps the maximum terminal voltage, i.e., output voltage, of the generator. More particularly, as current I* increases in winding 30, generator 10 saturates independent of generator speed thus capping the output voltage.

A preferred implementation of the present invention is for aircraft applications where the utilization equipment is typically designed for a peak operating voltage of approximately 180 V 1–n. The generator speed may vary by as much as 2:1 which, without peak voltage limiting, could result in maximum voltages exceeding the design capability of the utilization equipment. Current I* is therefore chosen to limit generator output voltage at about 170 V 1–n. Thus, the design of the utilization equipment need not be changed to accommodate higher peak voltage values, and the existing utilization equipment is further protected from over voltage conditions.

With reference once again to FIG. 1, a current sensor 40 is preferably utilized to monitor current I* flowing in winding 30. Since current is always flowing in winding 30 when the generator speed exceeds a lower value, monitoring the current flow in winding 30 within a tolerance value of the desired curve (e.g., FIG. 2) provides an indication of the proper operation of the peak voltage limiting circuit 11. The output of current sensor 40 is coupled to control signal source 36, which is further operable to compare the actual current in winding 30 to the desired current. In a fault condition, control signal source 36 may provide a signal to the GCU and/or take other appropriate measures. Alternatively, the output of current sensor 40 may be coupled directly to the GCU so that upon detection of a fault condition appropriate measures may be taken, such as de-exciting the generator field. In this manner, a fault in peak voltage limiting circuit 11 is determined upon occurrence of the fault and prior to a fault in generator 10 requiring proper operation of peak voltage limiting circuit 11.

In a method according to a preferred embodiment of the present invention, an auxiliary winding is provided in association with the exciter field magnetic structure. Current is selectively applied to the auxiliary winding in order move the quiescent flux point of the exciter field magnetic structure in order to limit a peak voltage output of the generator. The current is preferably applied as a function of the generator speed, and the applied current is preferably monitored to ensure proper operation of the peak voltage control system. Responsive to detecting an applied current outside a tolerance window of a desired applied current, the generator is deactivated, e.g., the exciter field is de-energized, or otherwise placed into a fault operating mode.

The present invention has been described in terms of several preferred embodiments intended to illustrate its many advantages and features. The preferred embodiments described herein should in no way be taken as limiting of its many potential applications. To determine the true and fair scope of the present invention reference is made to the subjoined claims.

We claim:

1. An apparatus for limiting a peak voltage of a generator, the generator including an exciter field magnetic structure and a rotor supported for rotation within the exciter field magnetic structure, the apparatus comprising:

an auxiliary winding associated with the exciter field magnetic structure;

a controllable current source coupled to the auxiliary winding for providing a current flow there through; and the current flow being based upon an operating characteristic of the generator to limit a maximum magnetic flux in the exciter field magnetic structure.

2. The apparatus of claim 1 further comprising a controller coupled to the controllable current source for providing a control signal thereto.

3. The apparatus of claim 1, wherein the exciter field magnetic structure comprises a field winding and when a field current in the field winding is zero the current flow is zero.

4. The apparatus of claim 3, wherein the field current defines a quiescent flux bias point for the exciter field magnetic structure and wherein the current flow is selected to alter the quiescent flux bias point.

5. The apparatus of claim 3, wherein the rotor includes a rotor coil and wherein the current flow is selected to limit a current induced in the rotor coil to a limited current less than a normal current induced in the rotor coil for a rotational speed of the rotor.

6. The apparatus of claim 1, wherein the operating characteristic comprises an operating characteristic selected from the group of operating characteristics comprising a generator speed and a frequency of generation.

7. The apparatus of claim 6, the current flow being linearly related to the generator speed.

8. The apparatus of claim 6, the current flow being zero below a predetermined generator speed.

9. The apparatus of claim 1, further comprising a current detector coupled to the auxiliary winding.

10. The apparatus of claim 9, the current detector coupled to the controllable current source, and the controllable current source operable to provide a fault signal.

11. A method of limiting peak voltage in a generator, the generator including an exciter field magnetic structure and a rotor supported for rotation within the exciter field magnetic structure, the method comprising the steps of:

providing an auxiliary winding in association with the exciter field winding of the generator;

sensing a generator operating characteristic;

selectively applying a current to the auxiliary winding responsive to a generator operating characteristic to limit generator peak voltage output.

12. The method of claim 11, wherein the variable current is linearly related to the generator operating characteristic.

13. The method of claim 11, wherein the generator operating characteristic comprises one of the group of generator operating characteristics comprising a generator speed and a generator frequency.

14. The method of claim 11, further comprising:

detecting the current outside a tolerance, and determining a fault condition based upon the detected current.

15. The method of claim 11, wherein the rotor includes a rotor coil and wherein the step of selectively applying a current comprises applying a current sufficient to limit a current induced in the rotor coil to a limited current less than a normal current induced in the rotor coil for a rotational speed of the rotor.

16. A method of limiting peak voltage in a generator, the generator including an exciter field having a magnetic state and a rotor supported for rotation within the exciter field, the method comprising the steps of:

sensing an operating characteristic of the generator; and offsetting the magnetic state of the exciter field to limit a peak voltage of the generator responsive to the operating characteristic.

17. The method of claim 16, wherein the step of offsetting the magnetic state of the exciter field comprises the steps of:

providing an auxiliary winding in association with exciter field; and applying a current to the auxiliary winding.

18. The method of claim 17, wherein the applied current is related to the operating characteristic of the generator.

19. The method of claim 17, wherein the applied current is linearly related to the operating characteristic of the generator.

20. The method of claim 16, wherein the operating characteristic of the generator comprises an operating characteristic of the generator selected from the group of operating characteristics of the generator comprising a generator speed and a generator frequency.

21. The method of claim 16, wherein the rotor includes a rotor coil and wherein the step of selectively applying a current comprises applying a current sufficient to limit a current induced in the rotor coil to a limited current less than a normal current induced in the rotor coil for a rotational speed of the rotor.

22. The method of claim 16, further comprising the steps of sensing the applied current and determining a fault condition based upon the sensed applied current.

* * * * *